United States Patent
Hisaki et al.

(10) Patent No.: US 6,674,917 B1
(45) Date of Patent: Jan. 6, 2004

(54) METHOD OF SYNTHESIZING AN IMAGE FOR ANY LIGHT SOURCE POSITION AND APPARATUS THEREFOR

(75) Inventors: Kazuya Hisaki, Kawasaki (JP); Makoto Kato, Sagamihara (JP); Toshiyuki Moritsu, Yokohama (JP); Nobuo Kotatsu, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/407,841

(22) Filed: Sep. 29, 1999

(30) Foreign Application Priority Data

Sep. 29, 1998 (JP) .......................... 10-274548

(51) Int. Cl.[7] .......................... G06K 9/36; G06T 15/50; G03B 15/03
(52) U.S. Cl. .......................... 382/284; 345/426; 396/155
(58) Field of Search .......................... 382/284, 162, 382/181, 254, 312, 3, 17, 11, 18; 348/174, 216.1; 359/464; 345/426, 597; 396/4, 20, 62, 155

(56) References Cited

U.S. PATENT DOCUMENTS

| | | | | |
|---|---|---|---|---|
| 4,292,662 A | * | 9/1981 | Gasperini | 362/17 |
| 4,695,130 A | * | 9/1987 | Medina et al. | 359/464 |
| 5,077,640 A | * | 12/1991 | Butler, Jr. | 362/11 |
| 5,392,075 A | * | 2/1995 | Gai | 348/663 |
| 5,864,364 A | * | 1/1999 | Ohyama et al. | 348/211.14 |
| 5,905,503 A | * | 5/1999 | Penna | 345/426 |
| 6,104,438 A | * | 8/2000 | Saito | 348/587 |
| 6,270,228 B1 | * | 8/2001 | Axen et al. | 362/3 |

FOREIGN PATENT DOCUMENTS

JP 1143127 6/1989

OTHER PUBLICATIONS

"Graphics and Vision—Digital Image Processing" by Masayuki Nakajima and Masanobu Yamamoto, Ohmsha, Ltd. 1996 pp. 97–104.

"Graphics and Vision—Digital Image Processing" by Masayuki Nakajima and Masanobu Yamamoto, Ohmsha, Ltd. 1996 pp, 40–43.

"A Formalization of Photometric Stereo Method Using Two Light Sources and Its Application to Reconstruction of Human Skin Replicas" by Koichi Shinmoto, Tsunenori Honda and Shun–ichi Kaneko. vol. J82–D–II No.1 pp 10–18 1999.

* cited by examiner

Primary Examiner—Bhavesh M. Mehta
Assistant Examiner—Kanji Patel
(74) Attorney, Agent, or Firm—Antonelli, Terry, Stout & Kraus, LLP

(57) ABSTRACT

Light sources are disposed at a plurality of different positions for an object body to be photographed, and a plurality of images corresponding to respective light source positions are photographed, and from the change in the direction or the color on the surface of the object body to be photographed, the parameters to be the coefficient for introducing the direction or the color on the surface of the object body observed from the light source position are measured, and an image can be synthesized for any light source position using the above-mentioned data. Thereby, it is made possible to synthesize an image for any light source position with the data which can be easily available as the images of an object body photographed with a camera and so on, without needing many hands or special tools.

11 Claims, 5 Drawing Sheets

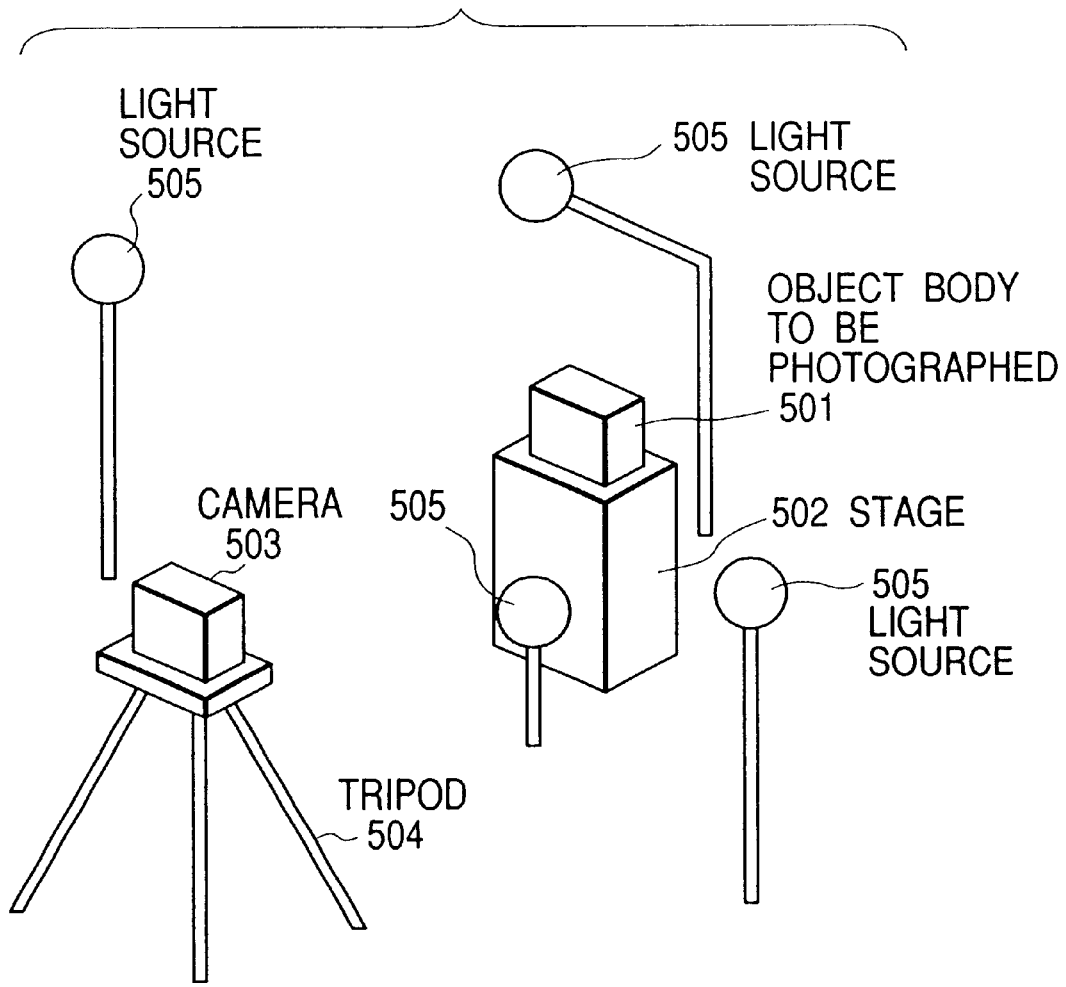

METHOD OF SYNTHESIZING AN IMAGE FOR ANY LIGHT SOURCE POSITION AND APPARATUS THEREFOR

BACKGROUND OF THE INVENTION

1. Field of the Invention

The present invention relates to image synthesis for producing a new image by performing calculations for a plurality of images.

2. Description of the Prior Art

As a method for obtaining images irradiated with light from any position for an actual 3-dimensional object, as shown on pages, 97 to 104 in [Graphics and Vision—Digital Image Processing] by Masayuki Nakajima and Masanobu Yamamoto, Ohmsha, Ltd., 1996, a method shown in the following is generally known. In the method, the 3-dimensional coordinates of a plurality of characteristic points on the surface of an object body are measured, and a 3-dimensional geometrical model is constructed by sticking the texture image on the surfaces of the polyhedron which makes these characteristic points apexes, and after that a light source position is provided to perform rendering by ray tracing or the like.

In a conventional method mentioned in the preceding paragraph, there is a difficulty to require many hands or special tools for the measurement of 3-dimensional coordinates on the surface of the object. It requires a lot of calculation quantity for the rendering taking the light source position for the 3-dimensional object into consideration and a long processing time for synthesizing an image, so that there are also difficulties in a case where real time processing is to be performed.

SUMMARY OF THE INVENTION

An object of the present invention is to provide a method of synthesizing an image for any light source position and the apparatus therefor from the data which are easily available like images of an object body photographed with a camera without requiring many hands or special tools as generally required in a case where a 3-dimensional geometrical model is constructed.

In order to solve the above-mentioned subject, the present invention adopts a method and a means as described in the following.

The present invention provides a method of synthesizing an image for any light source position and the apparatus therefor in which information concerning at least one of a direction and a color on the surface of an object body to be photographed, is extracted from a plurality of original images photographed at changed light source positions in relation to respective positions of the light source, and an image for any light source position can be synthesized based on the extracted information.

For example, as a simple synthesizing method, it can be considered to take a weighted average of every pixel in the image data when light sources are disposed on the left and the right sides of an object body; however, the image is not synthesized based on a model, so that the relation between the synthesized image and the position of a light source is not clear. Therefore, it is not possible to say that the synthesized image correctly reflects the change of the light source position. As shown on pages, 40 to 43, in "Graphics and Vision—Digital Image Processing" by Masayuki Nakajima and Masanobu Yamamoto, Ohmsha, Ltd., 1996, in general, an original color, a normal, the directions toward a light source as well as a view point, all have definite relations between a color actually observed. Therefore, in the present invention, an image is synthesized for any light source position using such relations.

According to the Japanese Patent Laid-open No. Hei 1-143127, an electron microscope is equipped with a plurality of electron detectors. An object body is irradiated from a certain direction with electron beams and the reflected electrons on the surface of the object body are diffused toward respective directions. By measuring the diffusion of electrons, the normals on the surface of the object body are found. In the present invention, similarly to the above, the images of an object body are photographed with light sources disposed in a plurality of different positions, and from the change in colors for the light source positions, that is, from the change in diffusion of light reflected on the surface of the object body, the parameters to be the coefficient for deducing a color which is actually observed from light source positions such as an original color or inclination on the surface of the object body are measured. Using these parameters, an image can be synthesized for any light source position, whereby it is made possible to provide an image synthesizing method and the apparatus therefor with which an object body can be observed while freely moving a light source position.

The foregoing and other objects, advantages, manner of operation and novel features of the present invention will be understood from the following detailed description when read in connection with the accompanying drawings.

BRIEF DESCRIPTION OF THE DRAWINGS

FIG. 5 shows a configuration of a second embodiment.

DETAILED DESCRIPTION OF THE PREFERRED EMBODIMENTS

In the following, a first embodiment according to the present invention will be explained in detail.

Figure 1:
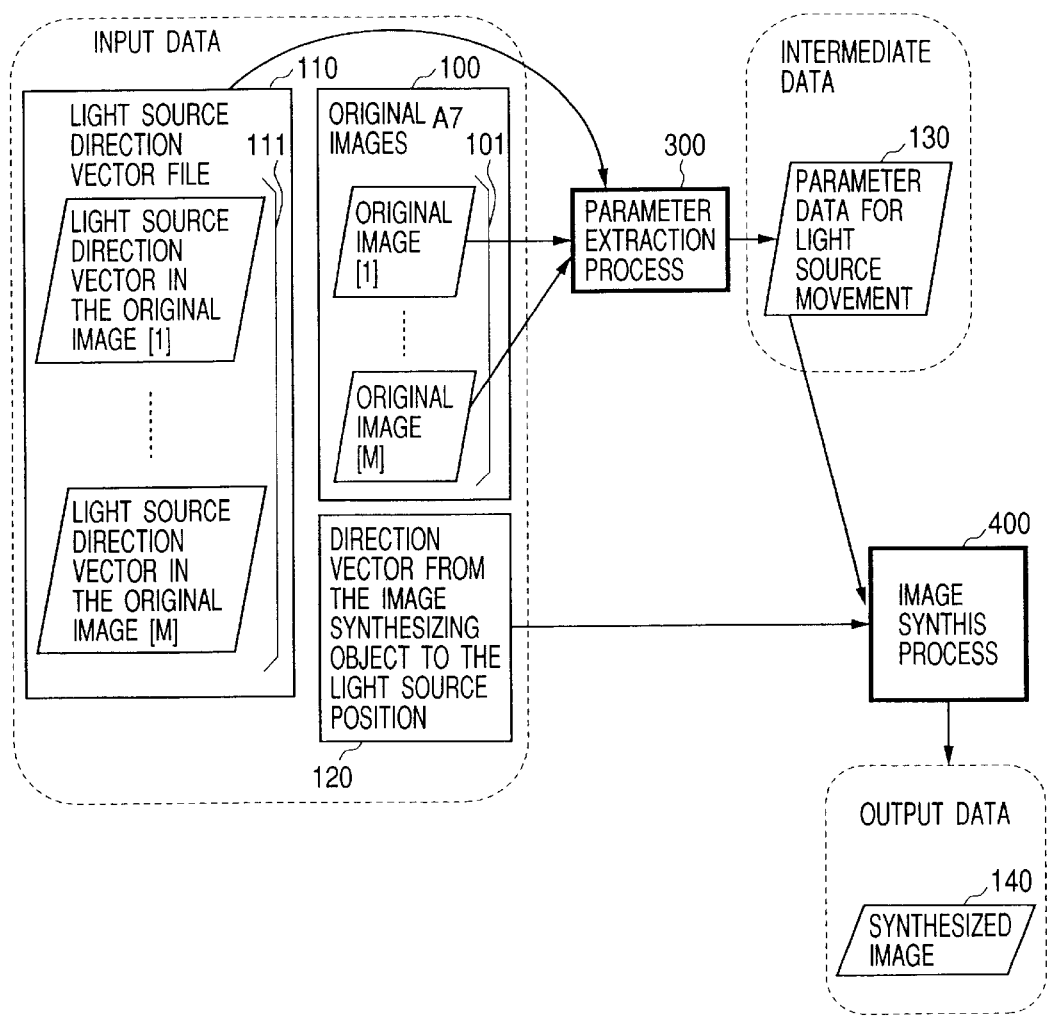
FIG. 1 shows processing procedures and input/output data in a first embodiment.
Figure 2:
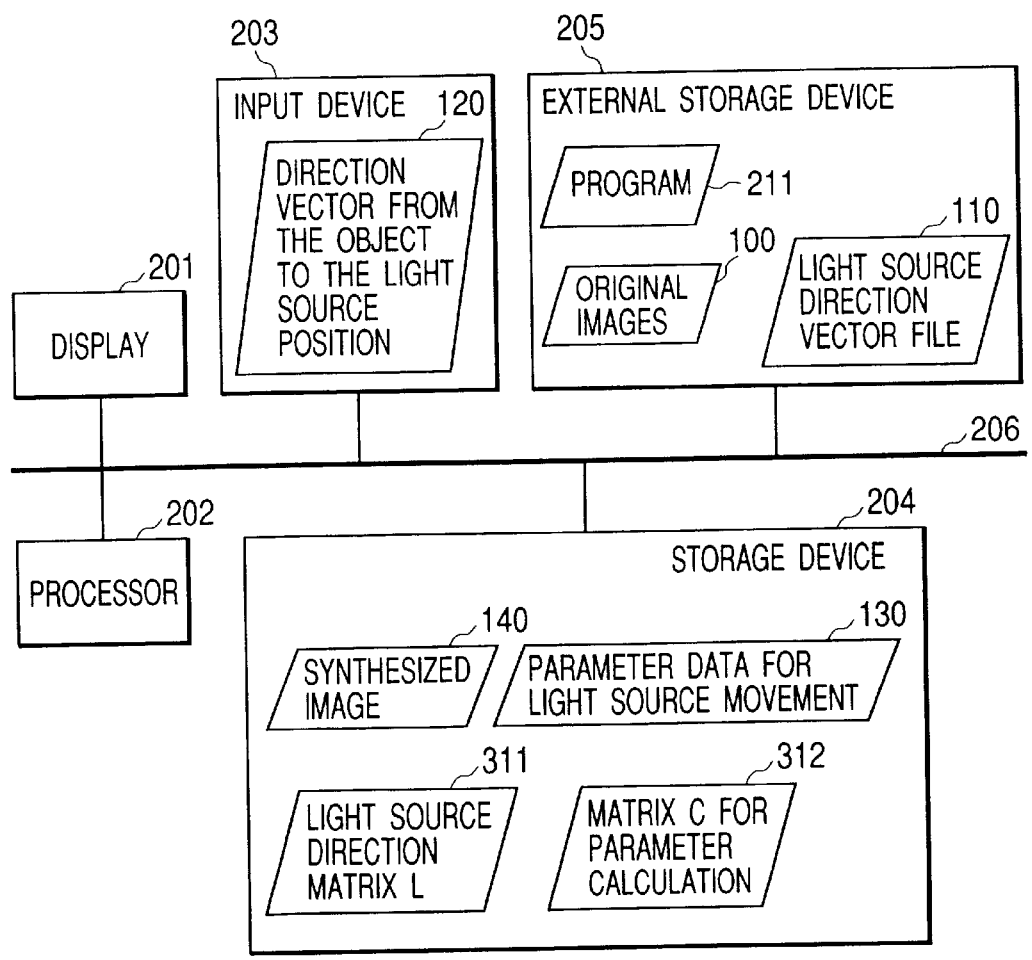
FIG. 2 shows a block diagram of the hardware system in the first embodiment.
Figure 3:
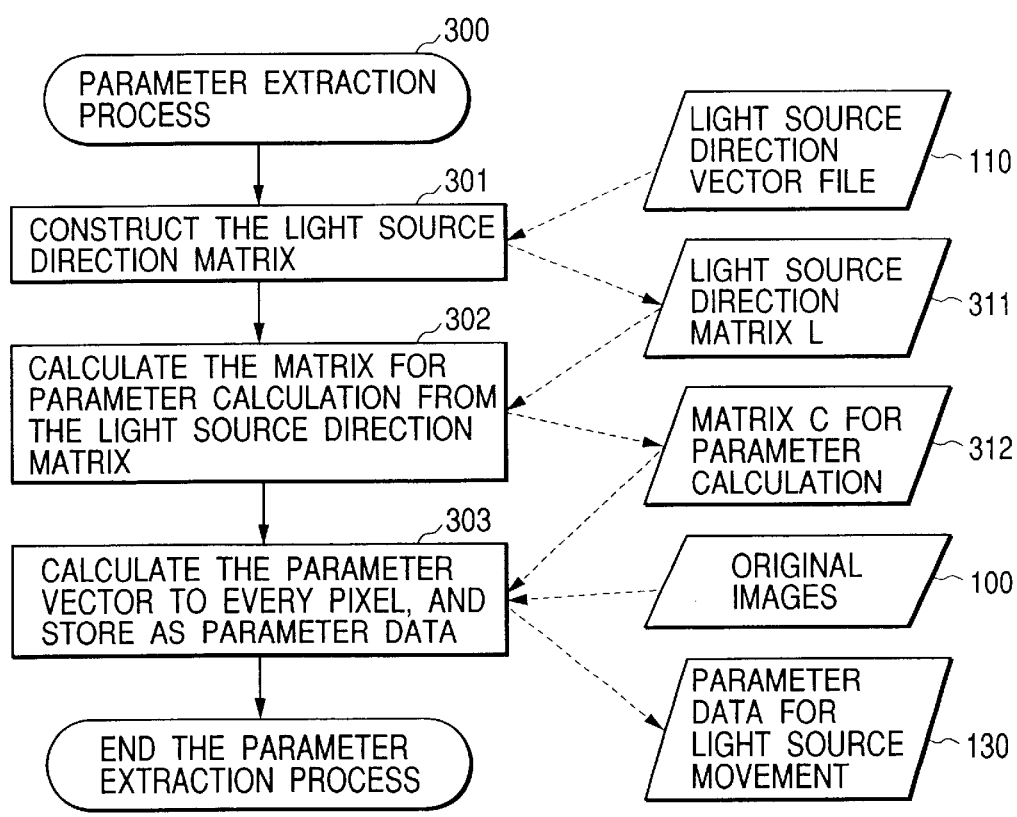
FIG. 3 shows a flowchart showing processing procedures of a parameter-extracting-process in the first embodiment.
Figure 4:
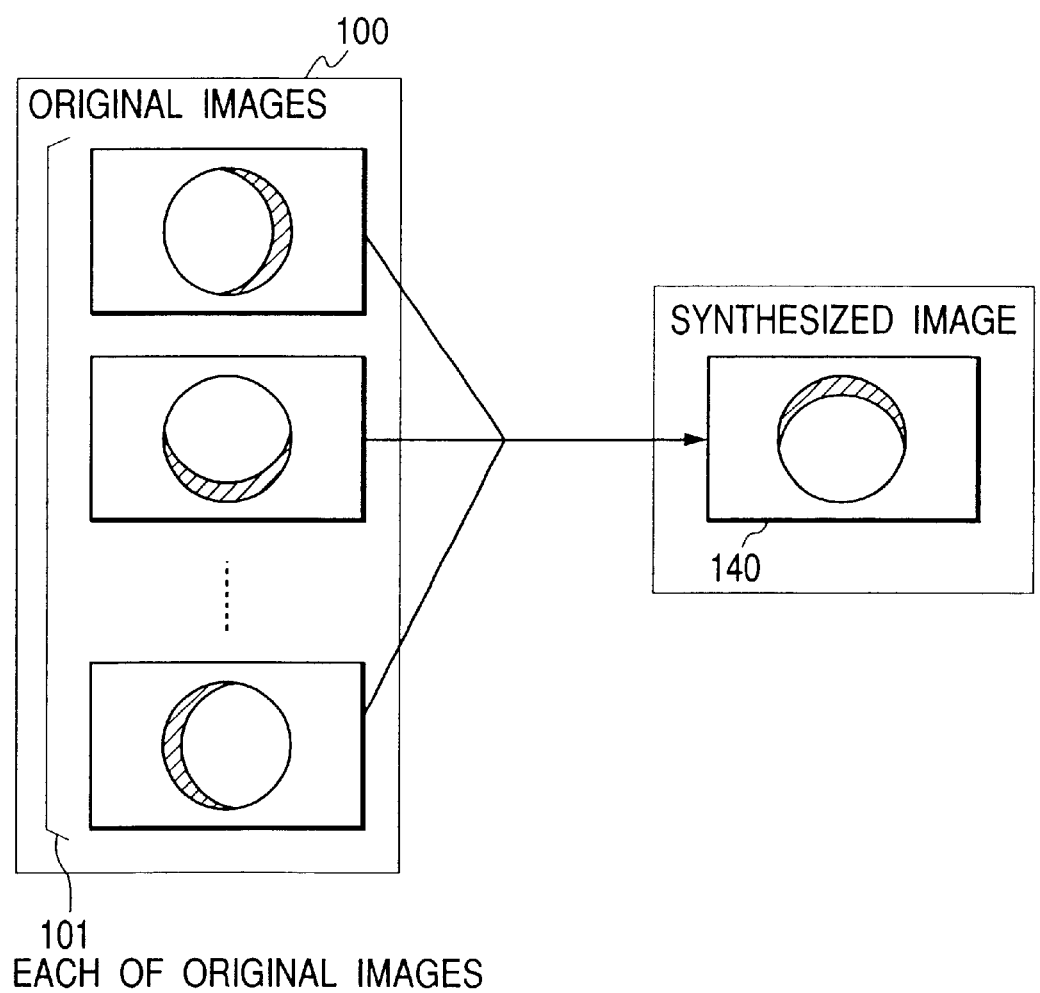
FIG. 4 show an example of output/input images used in the first embodiment.

FIG. 1 shows principal processing procedures and input/output data in the present invention. FIG. 2 shows a hardware system configuration of the first embodiment. FIG. 3 shows the flowchart of processing procedures of the parameter extraction process 300. FIG. 4 shows an example of an original image group in the input and a synthesized image in the output.

As shown in FIG. 2, the hardware system configuration in the first embodiment comprises a display device 201, a processor 202, an input device 203, a storage device 204 and an external storage device 205, which are connected to a bus 206, and a data transmission path. The display device 201 is, for example, a CRT display, and it displays a synthesized image 140 or instructions for a user. The process device 202 is, for example, a CPU or an MPU, and it execute the parameter extraction process 300 and an image synthesizing process 400. The input device 203 is, for example, a mouse or a touch panel, and it receives an input, a direction vector 120 of the light source position in an image to be synthesized. The storage device 204 is, for example, a memory, and it temporarily stores parameter data 130 to be used for light source movement, a light source direction matrix L 311 to be used for the synthesized image 140 and the parameter extraction process 300, and a matrix C 312 to be used for parameter calculation. The external storage device 205 is, for example, a storage device such as an HDD, a recording medium such as an FD or a CD-ROM, or an external storage device for another computer connected with a network, and it stores a group of original images 100, a light-source-direction-vector-file 110, and a program 211 storing the data for the parameter extraction process 300 and the image synthesizing process 400, as shown in FIG. 1. The program 211 is read out to a processing device 202 when the process is executed.

In the following, the process procedures in the present embodiment will be described referring to FIG. 1. In order to simplify the description, the explanation will be given concerning a case where only a single primary color exists; however, in a case of color described later, concerning each primary color in the 3 primary colors, the above-mentioned process shown in the case of a single primary color will be performed.

The input data in the present invention are: As shown in FIG. 1, a group of original images 100 being composed of a plurality of original images 1M[m]101 (1≦m≦M) having the same sizes and photographed in a state where the positional relation between a camera and its object is relatively fixed and only the light source position therefor is changed (In a group of original images 1M[m]101, points in the same position when points are looked from the left-upper corners of respective images show a same point on the surface of the object body); the light-source-direction-vector-file 110 storing a vector, LV[m]=[LX[m], LY[m], LZ[m]]111, having a length of 1 and showing the 3-dimensional direction from the center of the object body toward the light source positions, shown in respective original images 1M[m]110; and a vector, 1v=[1x, 1y, 1z]120 having a length of 1 and showing the 3-dimensional direction toward a light source position in an image to be synthesized. The constant M expresses that the number of sheets of images in the original group 100 is M. Hereinafter, the parameters expressed with capitals including those having subscripts express constants and the parameters expressed with small letters express variables. Respective original images 1M[m]101 are digital images. A digital image is an image in which an image is divided into small discontinuous points called pixels and the luminance values at respective pixels are also expressed by discontinuous values. Respective pixels in a digital image are expressed by 2-dimensional vectors, [x, y] (1≦x≦X, 1≦y≦Y). In this case, X and Y mean that the original image is composed of X pixels in the horizontal direction and Y pixels in the vertical direction. A pixel [x, y] expresses that it is the xth pixel in the horizontal direction and the yth pixel in the vertical direction.

The parameter-data-extraction-process 300 is a process to find the parameter data 130 for light source movement to be used for synthesizing an image for any light source position from the group of original images 100 and the light-source-direction-vector-file 110.

The parameter data 130 for light source movement is a matrix of Y rows and X columns, making a 4-dimensional vector, k[x, y]=[kdx[x, y], kdy[x, y], kdz[x, y], ka[x, y]] an element corresponding to each pixel [x, y] in the group of original images 100, to be used for synthesizing an image for any light source position.

The image synthesizing process 400 is a process which synthesizes an image for a light source position shown by the vector 120 from the parameter data 130 for light source movement and the vector lv[lx, ly, lz]120 showing the direction toward the light source in the synthesized image and outputs the synthesized image 140.

The synthesized image 140, the output data, is a digital image of X pixels in the horizontal direction and Y pixels in the vertical direction in the same manner as respective original images IM[m]101.

In the following, the parameter extraction process 300 will be explained in detail referring to FIG. 3.

In a processing step 301, the unit vectors, LV[m]=[LX[m], LY[m], LZ[m]]111 which express light source directions for respective original images IM[m]101 are subsequently read out from the light-source-direction-vector-file 110 stored in the external storage device 205 to constitute the light-source-direction-matrix L 331 of M row, 4 columns as shown in equation 1 and write it on the storage device 204.

$$L = \begin{bmatrix} LX[1] & LY[1] & LZ[1] & 1 \\ LX[2] & LY[2] & LZ[2] & 1 \\ \cdots & \cdots & \cdots & \cdots \\ LX[M] & LY[M] & LZ[M] & 1 \end{bmatrix} \quad (1)$$

In a processing step 302, the light-source-direction-matrix L 311 is read out from the storage device 204 for calculations as shown in equation 2 to find a matrix C 312 of 4 rows and M columns used for the calculation of parameters, and the result is written on the storage device 204.

$$C = INV(LT \cdot L) \cdot LT \quad (2)$$

In equation (2), LT expresses a matrix of 4 rows, M column in which an element positioned at r row, c column in L is disposed at c row, r column (The matrix is called a transposed matrix of L), LT·L expresses the product of a matrix LT of 4 rows, M columns and a matrix of M rows, 4 columns (a matrix of 4 rows, 4 columns), and INV(LT·L) expresses an inverse matrix of a matrix (LT·L) having the same number of rows and columns. An inverse matrix of a matrix A having the same number of rows and columns expresses a matrix B satisfying the equation A·B=I (I expresses a matrix satisfying the equation A·I=A for any matrix A).

In a processing step 303, the matrix C 312 for parameter calculation is read out from the storage device 204, and the group of original images 100 is read out from the external storage device 205. For a pixel [x, y], a vector, IV[x, y]=[I[1][x, y], I[2][x, y], - - - , I[m][x, y]] is constructed which makes the luminance I[m][x, y] observed in respective original images IM[m]100 elements, and the parameter vector, k[x, y]=[kdx[x, y], kdy[x, y], kdz[x, y], ka[x, y]], can be found by equation (3) using the matrix C 312 for parameter data calculation. The obtained k[x, y] is stored in the parameter data 130 for light source movement.

$$k[x, y] = C \cdot IV[x, y] \quad (3)$$

In this case, k[x, y] and IV[x, y] are column-vectors (a matrix of one column). Hereinafter, when the calculation is performed concerning matrices and vectors, vectors are assumed to be column-vectors. The calculation as shown in the above will be repeated for all pixels, [x, y] (1≦x≦X, 1≦y≦Y).

The bases of calculation processes, performed in processing steps, 301 to 303, are shown in the following.

In the present embodiment, on condition that specular reflection does not occur on the surface of an object body, normal vectors on the surface of an object body, color coefficients by diffused reflection, and color luminance by ambient light are used as parameters. The light source is disposed apart from the object body at an enough distance and the rays of light are regarded as parallel rays, and the direction toward the light source is regarded to be constant at any position on the surface of the object body. The direction toward the light source is the direction from the center of the object body toward the light source.

In a case where there is no specular reflection and an ambient light exists, the luminance value i[x, y] at each pixel [x, y] can be expressed as shown in equation (4), assuming that kd[x, y] expresses the coefficient of the diffused reflection component, ka[x, y] expresses the luminance value by the ambient light, and $\theta$ expresses an angle between the direction of the normal on the surface of the object body and the direction toward the light source from the center of the object body.

$$i[x, y] = kd[x, y] \cdot \cos \theta + ka[x, y] \quad (4)$$

When $\cos \theta$ is expressed by the scalar product of a unit vector showing the light source direction and a unit vector n[x, y]=[nx[x, y], ny[x, y], nz[x, y]] expressing normals of the object body, equation (4) can be rewritten as equation (5).

$$i[x, y] = kd[x, y] \cdot ([lx, ly, lz] \cdot [nx[x, y], ny[x, y], nz[x, y]]) + ka[x, y] \quad (5)$$

When a vector, [kdx[x, y], kdy[x, y], kdz[x, y]], having the same direction as n[x, y] and the same magnitude as kd[x, y] is introduced into equation (5), it can be rewritten as equation (6).

$$i[x, y] = [lx, ly, lz] \cdot [kdx[x, y], kdy[x, y], kdz[x, y]] + ka[x, y] = [lx, ly, lz, 1] \cdot [kdx[x, y], kdy[x, y], kdz[x, y], ka[x, y]] \quad (6)$$

When the parameter vector k[x, y] introduced in processing step 303 is substituted in equation (6), it becomes equation (7).

$$i[x, y] = [lx, ly, lz, 1] \cdot k[x, y] \quad (7)$$

When equation (7) is collected about all original images IM[m]101, one obtains equation (8).

$$\begin{bmatrix} I[1][x, y] \\ I[2][x, y] \\ \cdots \\ I[M][x, y] \end{bmatrix} = \begin{bmatrix} LX[1] & LY[1] & LZ[1] & 1 \\ LX[2] & LY[2] & LZ[2] & 1 \\ \cdots & \cdots & \cdots & \cdots \\ LX[M] & LY[M] & LZ[M] & 1 \end{bmatrix} \cdot k[x, y] \quad (8)$$

When the vector IV[x, y] used in processing steps, 302 and 303, and the matrix L are substituted in equation (8), it can be rewritten as equation (9).

$$IV[x, y] = L \cdot k[x, y] \quad (9)$$

Equation (9) is a linear simultaneous equation on the parameter of k[x, y], and by solving equation (9), one may be able to synthesize an image for any light source position; however if there is an error in an original image to make it impossible to strictly follow the model shown in equation (4), there might be a case where the solution for equation (9) does not exist. Therefore, parameter values are decided to make the difference between the luminance value in the original image i[x, y] and the calculated result of the luminance value, lv·k[x, y], based on the model minimum using the least-square approximation method.

In order to apply the least-square approximation method to a simultaneous equation in the form of matrix, the equation will be multiplied by a transposed matrix of the coefficient matrix, and then an inverse matrix of the coefficient matrix of the parameter vector will be found and solved. Therefore, at first, both sides of equation (9) will be multiplied by LT, the transposed matrix of L, as shown in equation (10).

$$LT \cdot IV[x, y] = LT \cdot L \cdot k[x, y] \quad (10)$$

Then, both sides of equation (10) will be multiplied by INV(LT·L), an inverse matrix of the (LT·L). Then, one will obtain equation (11) as shown below.

$$k[x, y] = INV(LT \cdot L) \cdot LT \cdot IV[x, y] = C \cdot IV[x, y] \quad (11)$$

The vector IV[x, y] can be found from equation (11) (being equal to equation (3)) and the parameter vector k[x, y] can be found from the matrix C.

In the following, an image synthesizing process 400 will be explained in detail.

In the image synthesizing process 400, the unit vector, lv[lx, ly, lz] 120 which shows the direction from the object body in the synthesized image toward the light source is read out from the input device 203. By using the read out unit vector 120 and the parameter vector k[x, y] stored in the parameter data 130 for the light source movement, the luminance i[x, y] of a pixel [x, y] in the synthesized image 140 can be found by equation (12), and it is written onto the storage device 204.

$$i[x, y] = [lx, ly, lz, 1] \cdot k[x, y] \quad (12)$$

The above processings are repeated concerning all pixels, [x, y] ($1 \leq x \leq X$, $1 \leq y \leq Y$) to obtain the synthesized image 140.

In the present embodiment, as mentioned in the above, explanation is given concerning the case where respective pixels in respective original images 101 sustain only luminance, that is, the case where images are single colored ones; however, the method according to the present embodiment can be applied to the case of color expression. In other words, the color in an image will be divided into the 3 primary colors, and the same processing as that performed in the case of a single colored image will be performed for each primary color and the results will be synthesized to obtain an image of the original color. For example, when the parameter extraction process 300 and the image synthesizing process 400 are performed for each of the divided primary color, it is possible to perform the synthesizing process of an image can be performed. At the time, it is also possible to irradiate with rays of light of a different color from that used in the case of photographing by giving different weight from the original one to each primary color.

In a case where only a group of original images photographed under a certain condition such as the case where the light source position is on a horizontal surface or a vertical surface passing the center of an object body are handled, the matrix C 312 for parameter calculation is formulated beforehand based on the condition, and in the parameter extraction process 300 only the processing step 303 is performed, which makes it possible to grade up the process speed in the parameter extraction process 300.

Further, in a case where a lot of image synthesizing processings are performed about a group of original images, the parameter data 130 obtained in the parameter extraction process 300 are once output to the external storage device 205 as an intermediate file, and when image syntheses are performed, the intermediate file is read into the storage device 204, and then only the image synthesizing process 400 is performed, which also makes it possible to upgrade the process speed.

Further in the present embodiment, it is assumed that the light source is disposed at an enough distance and the direction toward the light source is constant at any position on the surface of an object body; however, it is possible to synthesize an image taking the distance to the light source into consideration as a finite distance by correcting the directions of light-source-direction-vectors 111 and 120 according to the positions of pixels to execute the parameter extraction process 300 and the image synthesizing process 400.

In the following, the second embodiment according to the present invention will be explained in detail. In the configuration of the second embodiment, as shown in FIG. 5, an object body 501 is fixed on a stage 502, a camera 503 is put up on a tripod 504 and fixed at a position in a range where the object body 501 can be photographed, and a plurality of light source groups 505 are disposed around the object body 501 and fixed. The shutter of the camera 503 is interlinked with the power switch of the light source groups 505, and every time when the shutter is operated, a lamp or a plurality of lamps in the light source groups 505 are made ON in an order determined beforehand, and photographing is performed. Thereby, a plurality of images of the object body of which only the light source positions are different can be obtained.

In the present embodiment, the operation of the power source switch of light source groups 505 is interlinked with the shutter of the camera 503, but the operation of the power source switch may be performed manually before photographing.

In the present embodiment, the object body 501 and the camera 503 are fixed and some light sources among a plurality of light source groups are made ON, but it is also possible to obtain a plurality of images of the object body 501 of which only the light source positions are different by disposing and fixing one light source or a plurality of light sources being constantly made ON, and the object body 501 and the camera 503 being fixed on a rotary table, and photographing being performed in order in rotating the table.

As mentioned in the above, according to the present invention, an image can be synthesized for any light position from several sheets of images of an object body photographed at different light source positions without using a method which requires a large amount of calculation such as rendering. A plurality of images photographed at different light source positions can be simply obtained which are needed for synthesizing an image for any light source position.

What is claimed is:

1. A method of synthesizing an image for any light source position comprising:
    extracting information concerning at least one of a direction and a parameter of a color on a surface of an object body, based upon a plurality of original images, each of said original images including at least an area for extracting said information, said area corresponding to said surface of said object body, and also each of said original images corresponding to one of a plurality of lighting directions from light sources to surface of said object body; and
    synthesizing an image for any lighting direction, based on said extracted information.

2. A method of synthesizing an image for any light source position according to claim 1, wherein said information concerning at least one of the direction and the parameter of the color on the surface of said object body is at least one of information about normals, coefficients of diffused reflection, and values of luminance by an ambient light on the surface of said object body.

3. A method of synthesizing an image for any light source position according to claim 1, comprising extracting the information concerning at least one of the direction and the color on the surface of the object body using a least-square approximation method in order to minimize an error between an original image and a synthesized image.

4. A method of synthesizing an image for any light source position according to claim 1, wherein said plurality of sheets of original images are obtained through photographing said surface of said object body.

5. A method of synthesizing an image for any light source position according to claim 1, wherein said area for extracting said information in each of said original images comprises at least a pixel.

6. An apparatus for synthesizing an image for any light source position comprising:
    means for extracting information concerning at least one direction and a parameter of a color on a surface of an object body, based upon a plurality of original images, each of said original images including at least an area for extracting said information, said area corresponding to said surface of said object body, and also each of said original images corresponding to one of a plurality of lighting directions from light sources to said surface of said object body; and
    means for synthesizing an image for any lighting direction, based on the extracted information.

7. An apparatus for synthesizing an image for any light source position according to claim 6, wherein said plurality of sheets of original images are obtained through photographing said surface of said object body.

8. An apparatus for synthesizing an image for any light source position according to claim 6, wherein said area for extracting said information in each of said original images comprises at least a pixel.

9. An apparatus for synthesizing and displaying an image for any light source position comprising:
    means for extracting information concerning at least one of a direction and a parameter of a color on a surface of an object body, based upon a plurality of original images, each of said original images including at least an area for extracting said information, said area corresponding to said surface of said object body, and also each of said original images corresponding to one of a plurality of lighting directions from light sources to said surface of said object body;
    means for synthesizing an image for any lighting direction, based on said extracted information; and
    means for displaying the synthesized image.

10. An apparatus for synthesizing and photographing an image for any light source position comprising:
    a camera;
    an object body to be photographed whose positional relation being fixed relatively to the position of said camera;
    at least one light source disposed for photographing said object body in correspondence with a plurality of lighting directions from said light sources;
    a switch means;

means for photographing a plurality of original images in response to ON/OFF of said at least one light source with said camera by changing over said switch means to make said plurality of light sources perform ON/OFF;

means for extracting information concerning at least one of a direction and a parameter of a color on the surface of said object body, based upon said plurality of original images; and means for synthesizing an image for any light source position based on said extracted information.

11. An apparatus for synthesizing and photographing an image for any light source position comprising;

a camera;

an object body to be photographed whose positional relation being fixed relatively to the position of said camera;

at least one light source disposed for photographing said object body in correspondence with at least one lighting direction from said at least one light source;

means for relatively moving said at least one light source and said object body whose positional relation being fixed relatively to the position of said camera, to photograph with said camera a plurality of sheets of original images in response to the relative movement thereof;

means for extracting information concerning at least one of a direction and a parameter of a color on the surface of said object body, based upon said plurality of original images; and means for synthesizing an image for any light source position based on the extracted information.

* * * * *